(12) United States Patent
Gupta et al.

(10) Patent No.: US 12,505,863 B1
(45) Date of Patent: Dec. 23, 2025

(54) AUDIO-LIP MOVEMENT CORRELATION MEASUREMENT FOR DUBBED CONTENT

(71) Applicant: Amazon Technologies, Inc., Seattle, WA (US)

(72) Inventors: Honey Gupta, Patna (IN); Anil Kumar Nelakanti, Bangalore (IN); Palanivelu Balakrishnan, Bengaluru (IN); Saravanan Santhamoorthy Theckyam, Bangalore (IN); Prabhakar Gupta, Delhi (IN); Mayank Sharma, Bhopal (IN)

(73) Assignee: Amazon Technologies, Inc., Seattle, WA (US)

( * ) Notice: Subject to any disclaimer, the term of this patent is extended or adjusted under 35 U.S.C. 154(b) by 103 days.

(21) Appl. No.: 17/804,517

(22) Filed: May 27, 2022

(51) Int. Cl.
| | |
|---|---|
| *G11B 27/34* | (2006.01) |
| *G06V 20/40* | (2022.01) |
| *G06V 40/16* | (2022.01) |
| *G10L 15/02* | (2006.01) |
| *G10L 15/22* | (2006.01) |
| *G10L 15/25* | (2013.01) |
| *G10L 25/57* | (2013.01) |

(52) U.S. Cl.
CPC .............. *G11B 27/34* (2013.01); *G06V 20/46* (2022.01); *G06V 40/161* (2022.01); *G06V 40/171* (2022.01); *G10L 15/02* (2013.01); *G10L 15/22* (2013.01); *G10L 15/25* (2013.01); *G10L 25/57* (2013.01); *G10L 2015/025* (2013.01)

(58) Field of Classification Search
CPC ...... G11B 27/34; G06V 40/171; G06V 20/46; G06V 40/161; G10L 15/02; G10L 15/22; G10L 15/25; G10L 25/57; G10L 2015/025

USPC .......................................................... 386/279
See application file for complete search history.

(56) References Cited

U.S. PATENT DOCUMENTS

| | | |
|---|---|---|
| 11,514,948 B1 | 11/2022 | Nair et al. |
| 11,545,134 B1 | 1/2023 | Federico et al. |
| 12,205,614 B1 | 1/2025 | Sharma et al. |
| 2017/0040017 A1* | 2/2017 | Matthews ............... G10L 25/57 |
| 2021/0390949 A1* | 12/2021 | Wang ....................... G10L 15/04 |
| 2022/0036617 A1* | 2/2022 | Biswas .................... G06T 13/40 |
| 2023/0316007 A1 | 10/2023 | Shiratori et al. |

FOREIGN PATENT DOCUMENTS

WO    WO-2019111346 A1    6/2019

OTHER PUBLICATIONS

Baevski, A. et al., "wav2vec 2.0: A Framework for Self-Supervised Learning of Speech Representations", Facebook AI, Oct. 22, 2020, pp. 1-19.

(Continued)

*Primary Examiner* — Thai Q Tran
*Assistant Examiner* — Nienru Yang
(74) *Attorney, Agent, or Firm* — Weaver Austin Villeneuve & Sampson LLP

(57) ABSTRACT

Methods and apparatus are described for evaluating dubbing of media content. Phonemes in dubbed audio are extracted and mapped to visemes. Lip poses in video frames of the media content corresponding to the phonemes of the dubbed audio are compared to the visemes determined from the dubbed audio. A notification may be generated based on the comparison that indicates synchronization of the dubbed audio to lip poses of the video.

14 Claims, 5 Drawing Sheets

(56) References Cited

OTHER PUBLICATIONS

Bulat, A. et al., "How far are we from solving the 2D & 3D Face Alignment problem? (and a dataset of 230,000 3D facial landmarks)", In Proceedings of the IEEE International Conference on Computer Vision, 2017, pp. 1021-1030.

Chung, J.S. et al., "Out of Time: Automated Lip Sync in the Wild", In Asian conference on computer vision, (pp. 251-263), Nov. 2016, 4 pages.

McAuliffe, M. et al., "Montreal Forced Aligner: Trainable Text-speech Alignment Using Kaldi", Paper, 2017, 5 pages.

U.S. Appl. No. 17/661,165, inventors Sharma et al., filed on Apr. 28, 2022.

U.S. Non-Final Office Action dated Mar. 28, 2024 in U.S. Appl. No. 17/661,165.

U.S. Notice of Allowance dated Sep. 13, 2024 in U.S. Appl. No. 17/661,165.

\* cited by examiner

AUDIO-LIP MOVEMENT CORRELATION MEASUREMENT FOR DUBBED CONTENT

BACKGROUND

Users have an ever-increasing array of options for consuming media presentation, in terms of the types of media presentation (e.g., video, audio, etc.), providers of the media presentation, and devices for consuming the media presentation. Media presentation providers are becoming increasingly sophisticated and effective at providing media presentation quickly and reliably to users.

Users may understand various languages and prefer to consume content in a familiar language with dubbed audio. Dubbing audio may be performed using automation or with human speakers. Unfortunately, dubbed audio may not match facial expressions of the corresponding video, leading to a confusing user experience.

DETAILED DESCRIPTION

This disclosure describes techniques for evaluating synchronization between dubbed audio content and original video content. A clip of source audio in a source language may be transcribed, translated, and dubbed into speech of a target language. This dubbing may be performed manually or by automated methods. Typically, sentences and/or dialogue may be translated in a manner such that the words start and end at roughly the same time as in the original language. However, a user watching the original video content with the dubbed audio may perceive a difference between the lip poses shown in the video and expected lip poses, or visemes, based on the dubbed audio. This perceptual difference can be jarring for a viewer, which is undesirable. Thus, the synchronization may be assessed to improve the quality of the dubbing.

In some implementations, the source video and the dubbed audio may be individually analyzed to determine lip poses of the source video and expected visemes based on the dubbed audio. The lip poses of the source video and the visemes based on the dubbed audio may be compared to determine the similarity. If the expected visemes, based on the dubbed audio, and the source video are not similar, then the dubbed audio may be re-dubbed, the dubbing process modified to improve synchronization, or the original video altered to align lip poses with the dubbed audio. An example may be instructive.

Figure 1:
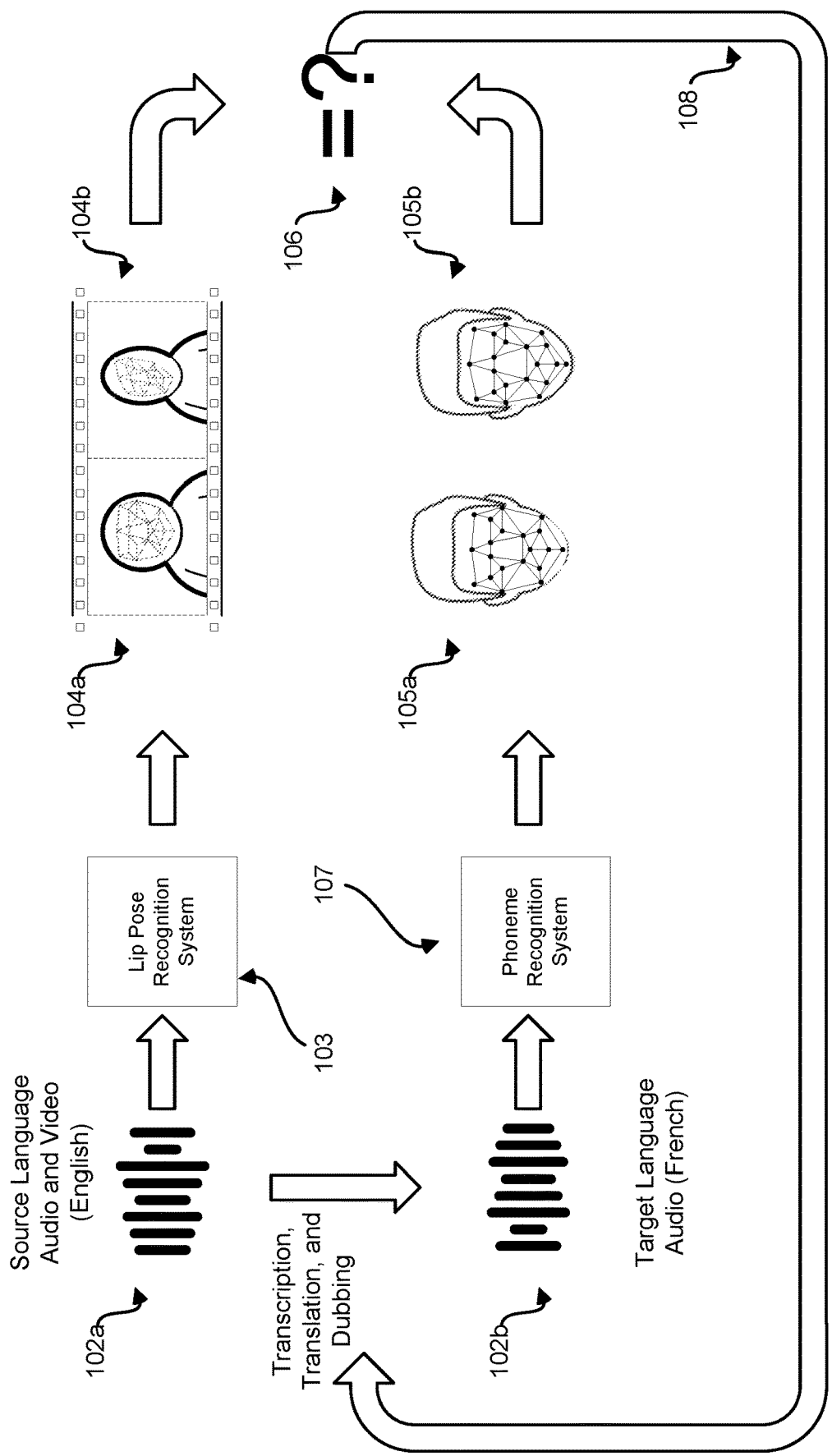
FIG. 1 presents a flow diagram of an operation for one example embodiment.

FIG. 1 presents an illustration of a dubbed content lip pose measurement system. A source language audio and video 102*a* may be part of a media presentation, e.g., a clip of the media presentation having a single speaker. The source language audio 102*a* may be dubbed into a target language audio 102*b*. The source language audio may be in, e.g., English, while the target language audio is, e.g., French. The dubbing process may be performed automatically or manually. In an automatic process, dubbing may occur as a process that includes transcribing the source audio, translating the transcription into a target language, and then dubbing the transcription into target language audio using a text-to-speech module. This may involve using one or more trained models.

The target language audio is provided to a phoneme recognition system 107. Phonemes are perceptually distinct units of sound in any language. The International Phonetic Alphabet (IPA) is a system of phonetic notation that may standardize representations of speech sounds across languages, though other systems may also be used in the scope of this disclosure. The phoneme recognition system may identify phonemes that are present in the dubbed audio and map the phonemes to visemes. In some implementations, the phoneme recognition system may include one or more trained models that receive an audio file as input and output phonemes of the audio.

Visemes are lip poses or facial expressions that are shared across multiple phonemes. For example, the word "pet" and "men" are visually similar in how a speaker's face produces the phonemes that make up both words, despite the words themselves sounding distinct. Thus, multiple phonemes may be mapped to a single viseme. Phoneme recognition system 107 may recognize phonemes in target language audio 102*b* and output corresponding visemes 105*a* and 105*b*. The visemes represent a lip pose (which may also be referred to as a facial pose or facial expression) that a speaker has when producing the corresponding phonemes. In some embodiments, a viseme is represented by a matrix of coordinates for facial landmarks, as shown in FIG. 1 by lines and vertices. In the example of FIG. 1 two visemes are shown, however the number of visemes may be more depending on the number of identified phonemes. Visemes 105*a* and 105*b* represent an expected lip pose based on the dubbed audio. Visemes 105*a* and 105*b* may have a corresponding index that indicates frames of video content to which Visemes 105*a* and 105*b* correspond.

Separately, lip pose recognition system 103 may process the source video and source language audio. The source video may be analyzed to determine lip poses of a speaker in the video, as shown in lip poses 104*a* and 104*b*. In some implementations, the speaker is not directly facing the camera, and thus the lip pose may be off-axis relative to the image plane of the camera, as shown in lip pose 104*b*. Lip pose 104*a* and 104*b* may share indices with visemes 105*a* and 105*b*, respectively (e.g., the dubbed audio from which viseme 105*a* is derived may share an index with the video content from which lip pose 104*a* is extracted).

In some embodiments, the source language audio may be used to assist in extracting lip poses. Phonemes in the source language audio may be identified and, based on the indices of the phonemes, the video frames sharing those indices may be analyzed to determine lip poses of a speaker.

The lip poses 104*a* and 104*b* of the source video and visemes 105*a* and 105*b* determined from the dubbed audio may then be compared (106). In some embodiments, lip poses and visemes may be represented by x, y coordinates of landmarks, such that the comparison may be a normalized mean error (NME) between each pair of corresponding lip pose and viseme. In some embodiments, the NME, or alternatively the lip poses and visemes, may be provided to a machine learning model trained to determine a score of how perceptually correlated the lip poses and visemes are for the clip. Various scoring systems may be used, such as a rating from 1 to 5, a single score and confidence interval, a binary match or not-matched score, etc.

Based on the comparison, a notification may be generated to signal that the target language audio 102*b* does not match the source language video 102*a*. In some embodiments, the notification may then be used as feedback to improve the transcription, translation, and/or text-to-speech process, as shown by arrow 108. In other embodiments, the notification may be a prompt for further review of the dubbing by a human operator. The human operator may then review the dubbing process to determine any sources of error that contribute to the non-matching dubbed audio and video frames. In some implementations, the visemes determined from the dubbed audio may be used for computer vision techniques to modify the video frames such that the lip poses of a speaker in the clip match the dubbed audio.

Figure 2:
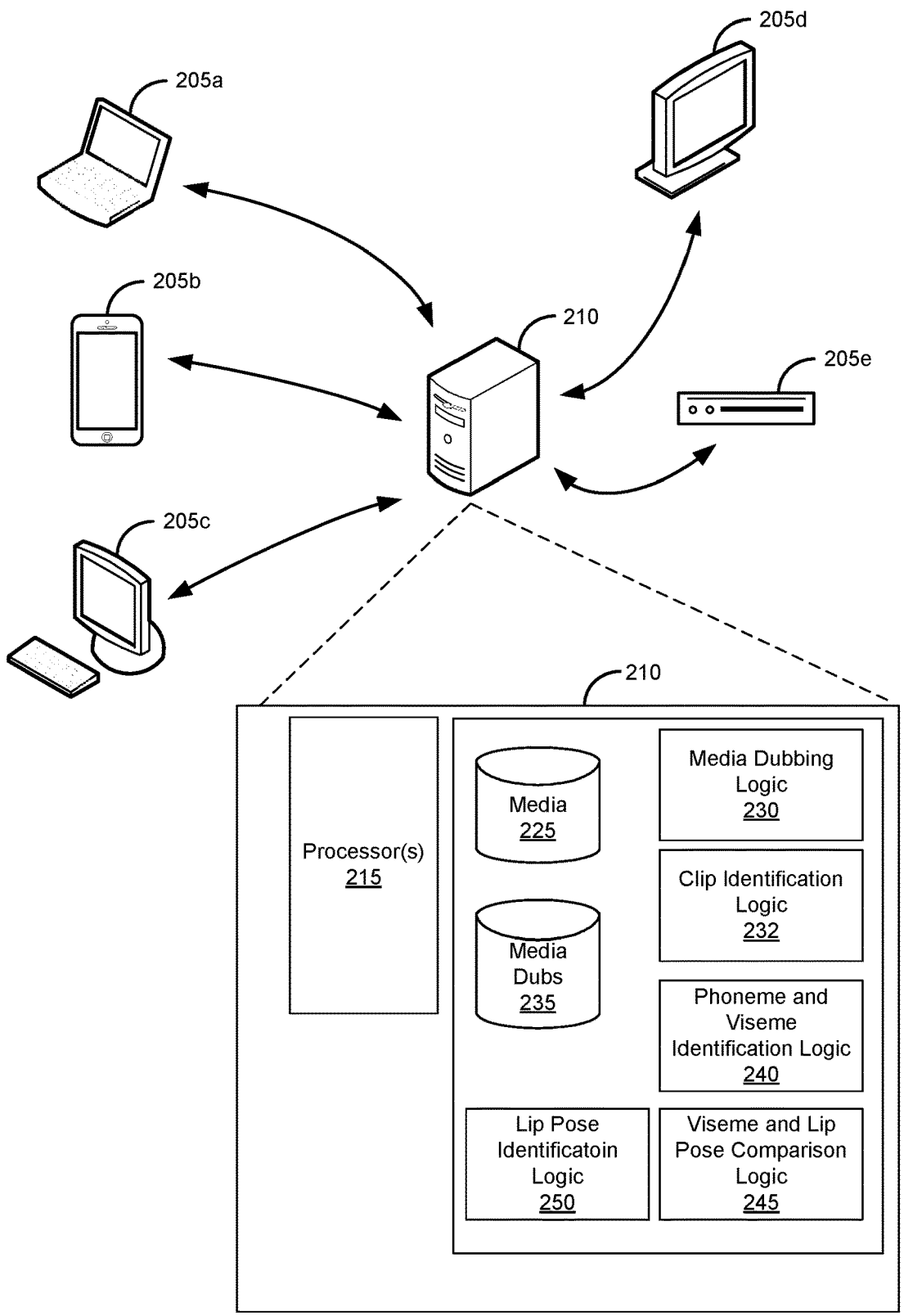
FIG. 2 presents an illustration of one example embodiment.

FIG. 2 illustrates an example of a computing environment in which source language audio/video and target language audio may be compared as enabled by the present disclosure. The computing environment of FIG. 2 includes media server 210 which can be used to provide a media presentation for playback on devices 205*a-e*.

It should be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media presentations herein is merely by way of example. Suitable alternatives known to those of skill in the art may be employed.

Media server 210 may be part of a content delivery system that conforms to any of a wide variety of architectures. The functionality and components of media server 210 can use one or more servers and be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc.

Media server 210 can include various types of logic used to provide media presentations for playback at devices 205*a-e*. In FIG. 2, media server 210 includes media presentation storage 225 and media dubs storage 235. Media server 210 also includes media dubbing logic 230, attribute classification logic 240, and segment comparison logic 245.

Media presentation storage 225 stores a variety of media presentations for playback on devices 205*a-e*, such as episodes of television shows, movies, music, etc. Media dubs storage 235 can be a storage mechanism, such as a database, storing audio dubs of media presentations in target languages other than the source audio of the media presentations. For example, various language dubs of every episode of a television show stored in media presentation storage 225 can be stored in media dubs storage 235.

In certain implementations, at least some of the contents of media dubs storage 235 may be generated automatically. For example, source language audio may be automatically transcribed to text and translated into a target language. Target language audio may then be generated based on the translated text using an automatic text-to-speech module. In some embodiments, media dubbing logic 230 may be used to automatically transcribe, translate, and generate target language audio from source language audio. In other embodiments, dubbing may be performed by a human operator.

Media server 210 also can include one or more processors 215, memory, and other hardware for performing the tasks and logic disclosed herein. Clip identification logic 232 performs tasks relating to identifying clips of media presentations that are suitable for analysis using methods described herein. Phoneme and Viseme identification logic 240 performs tasks relating to identifying phonemes in audio, both in source language and/or dubbed languages. Viseme and lip pose comparison logic 245 performs tasks relating to comparing source video lip poses and visemes determined from target language audio. Phoneme and viseme identification logic 240 can interface to viseme and lip pose comparison logic 245. For example, viseme and lip pose comparison logic 245 may receive visemes from phoneme and viseme identification logic 240 or embedded layer features. Lip pose identification logic 250 may identify lip poses in video frames. In some embodiments lips poses may be represented by a matrix of coordinates for facial landmarks. A video frame may be analyzed to determine facial landmarks, and the corresponding coordinates of each facial landmark may define the lip pose for an analyzed face. Lip pose identification logic 250 may comprise a trained machine learning model, such as a neural network, that is trained to analyze faces and determine a lip pose of a person in a frame.

Phoneme and viseme identification logic 240 may comprise a mapping of phonemes to visemes for a plurality of languages. In some embodiments, the mappings may be determined from a training set of clips of audio and video content of active speakers. Phonemes may be extracted from the audio. In some implementations, phonemes are based on the international phonetic alphabet (IPA), which represents a standardized set of phonemes that may be used for phonetic transcription of any language. In some implementations, phonemes may be determined by transcribing the audio and using the transcription to identify phonemes. For example, a Forced Aligner technique, such as the Montreal Forced Aligner, may be used to determine indices of phonemes in an audio file based on an accompanying transcription.

Once the phonemes and associated indices are determined, the video frames corresponding to the indices of the phoneme are analyzed to determine visemes. In some embodiments, a facial-landmark detection library may be used to determine a lip pose for each phoneme based on the associated video frames. In some embodiments a single video frame may be used, or multiple video frames may be analyzed and combined to determine a lip pose. This may be repeated for each sample to generate a set of phonemes and associated lip poses. The lip poses may then be used to build a reference pose for each viseme. As each viseme may map to multiple phonemes, in some embodiments a dictionary is used to map a plurality of phonemes to each viseme. In some embodiments, visemes may be used for phonemes of different languages. For example, a single viseme for 'p' may be used for 'b', 'p', and 'm' phonemes in French, Spanish, and English. Each viseme may be represented by a matrix of coordinates for facial landmarks. In some embodiments, each viseme may be determined by a combination of lip poses determined from the training clips. In some embodiments, visemes that are not common across the original language and the dubbed language are not considered for comparison.

In some embodiments, phoneme and viseme identification logic 240 has a mapping for phonemes that correspond to a set of visemes that are shared across multiple languages. For example, the set of visemes may be visemes that are shared between English, Spanish, French, German, Italian, and Portuguese. Using the mappings, phoneme and viseme identification logic may identify phonemes from audio and determine an expected viseme based on the identified phoneme. This expected viseme may then be compared to the actual lip pose present in the video frames sharing the indices of the identified phoneme.

Figure 3:
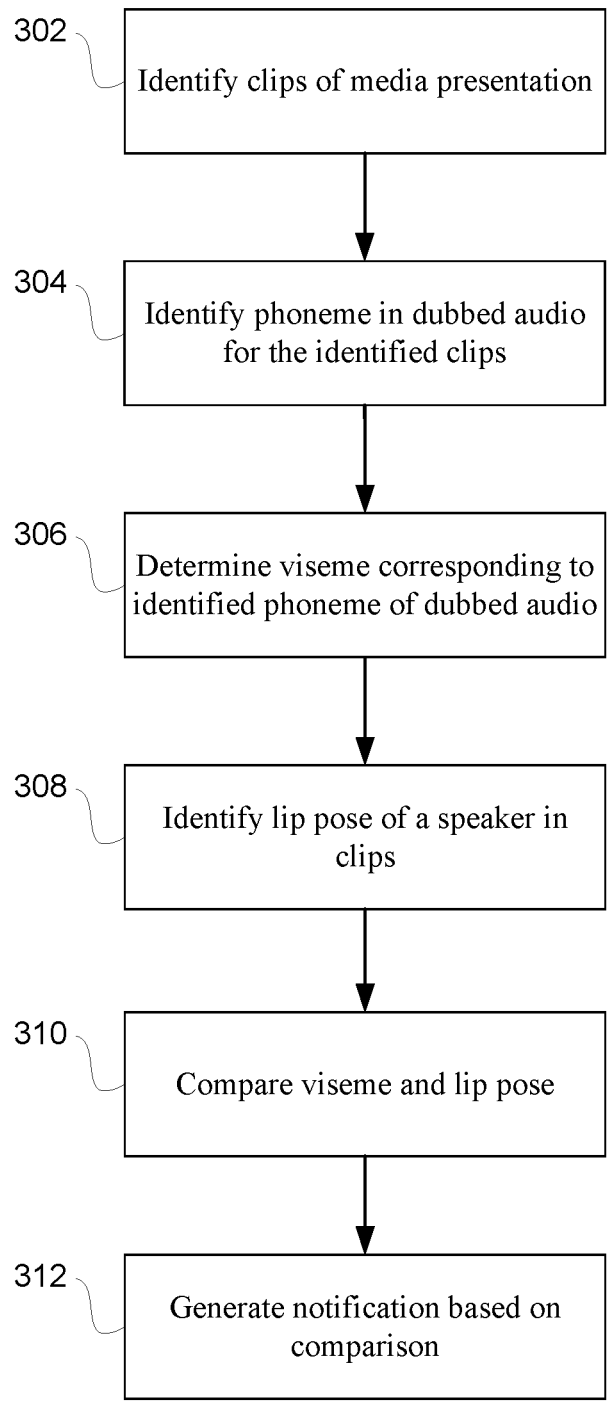
FIG. 3 presents a flow diagram for comparing lip poses of original video and visemes associated with dubbed audio.

A specific implementation in which one or more audio files are analyzed for attributes will now be described with reference to the computing environment of FIG. 2 and the flow diagram of FIG. 3. Clips of a media presentation are identified (302). In some implementations, clips may have a duration of at least about 4, 5, or 6 seconds. In some implementations, clips represent a single shot of the media presentation having a single speaker of speech in the corresponding audio. In some implementations, shots are a continuous sequence of frames. Analyzing shots having a single active speaker may improve efficiency by not analyzing shots where the speaker in the frame is not saying the words in the audio. Techniques for identifying clips are discussed further below in regard to FIG. 4. In some implementations, clips may be determined based on a dialogue boundary, e.g., a boundary between one or more speakers in a dialogue. Each clip may have an original language audio, video, and dubbed language audio content.

Phonemes of the dubbed audio are identified for each clip (304). Phonemes identified may be all or a subset of the phonemes present in the original and/or dubbed language. In some embodiments, the phonemes identified represent visemes that are common to both the original language and the dubbed language. As noted above, in some embodiments less than all visemes are used for analyzing dubbing and lip pose synchronization. Thus, in some embodiments only phonemes that are mapped to a viseme are identified.

Visemes are determined based on the identified phonemes of the dubbed audio (306). In some embodiments, the visemes that are determined are common to both the original language and the dubbed language. In some implementations, visemes may include a reference pose of facial landmarks. A sequence of visemes may be determined for each clip representing expected facial expressions, based on the dubbed audio. In some embodiments, the visemes that are determined are a subset of the total identified phonemes. As not all phonemes in a given language may have a mapped viseme, it is possible that only a subset of phonemes are mapped.

Lip poses of a speaker in each clip are identified (308). As noted above, lip poses may be determined using a facial-landmark detection library. In some embodiments, detecting lip poses may be based on the phonemes detected in the dubbed audio. The detected phonemes may be used to identify frames that have indices corresponding to indices of the identified phonemes. The frames may then be analyzed to determine lip poses. In some implementations, lip poses are a matrix of coordinates for landmarks in the original video content. In some implementations, a single frame is analyzed to determine lip poses. In some embodiments, multiple frames may be analyzed and combined to determine a single lip pose (for example, the phoneme and corresponding lip pose may be present across more than one frame).

The visemes determined from the dubbed audio are compared to the lip poses identified from the original video frames (310). In some implementations, this comparison may include calculating a lip pose-viseme distance between the determined viseme and temporally corresponding lip pose, e.g., the expected lip pose at an index, based on the dubbed audio, compared to the actual lip pose at that index. In some implementations this may be determined using a nominal mean error (NME), according to the following equation:

$$NME = \frac{1}{N}\Sigma\sum_{k=1}^{N}\frac{\|x_k - y_k\|_2}{d}$$

Where x denotes the lip pose of the speaker, y denotes the viseme based on the dubbed audio, and d is the square root of the bounding box for the lip pose of the speaker. Other techniques for comparing the lip pose and visemes may be used.

In some embodiments, the comparison may further comprise providing the NME or other scores determined based on the lip poses and the visemes to a trained machine learning model. The machine learning model may be trained on labelled data of dubbed clips having a score indicating how perceptually correlated the dubbed audio is with the lip-movements of the speaker in the corresponding video, as well as distances between lip poses of the speaker and expect visemes based on the dubbed audio. In some implementations, the data is labelled using a range of scores, e.g., a score of 1-5, where a higher score indicates a higher perception of correlation. In some embodiments, the data is labelled as synchronized or not synchronized. The machine learning model may be trained to receive lip pose-viseme comparisons and output a score indicating a prediction of how perceptually synchronized are the dubbed audio and the speaker's lip poses. In some embodiments, each of the lip pose-viseme comparisons determined for a single clip is provided as input, and the output is a score indicating perceptual synchronization for the entire clip or a portion of the clip. Various architectures may be used for the machine learning model, including neural networks, random forests, support vectors, multi-layered models, regressions, and classifiers.

In some implementations, the comparison may be performed using a model based on SyncNet. SyncNet is a machine learning model that may identify temporal lag between audio and video streams in a video as well as identify an active speaker amongst multiple faces in a video. In some embodiments, a SyncNet model may receive audio and video streams, extract embeddings from the audio and video in about 0.2 second blocks, and determine a distance between the embeddings to determine a temporal shift between the audio and video. In some implementations, this model may be used to assess alignment between the dubbed audio and the video based on the score indicating alignment. A higher score, indicating a greater temporal alignment between the dubbed audio and video, may be correlated with a greater perception of synchronization.

Notably, while SyncNet may be used to determine temporal leads or lags between audio and video content, in this disclosure clips may already be temporally aligned. Thus, the comparison of dubbed audio and video may represent whether the dubbed audio is perceived as correlating with the lip poses of the temporally corresponding video frames, rather than whether the dubbed audio should be temporally shifted relative to the video content.

A notification may be generated based on the comparison (312). In some embodiments, the notification may signal a human operator to manually verify and correct the dubbing in the target language audio. In some embodiments, the notification may be used as feedback to an automated dubbing module that generates the target language audio. In some embodiments, the notification may include the scores and/or lip pose-viseme distances as feedback to the automated dubbing module. In some embodiments, the notification may indicate time stamps where the lip pose-viseme distance is greater than a threshold value, indicating that the de-synchronization between the dubbed audio and the video frames is more disruptive to the user experience.

In some embodiments, the comparison may be used to modify video frames in the clip. Computer graphics effects can be used to adjust the lip movements of video frames that have a greater distance between the expected viseme and the actual lip pose. In some embodiments, lip pose-viseme distances greater than a threshold value may be flagged for modification of the video frames to increase alignment between the lip pose shown in the video frame and the expected viseme. Modification of lip poses may be done manually or using an automated process.

Figure 4:
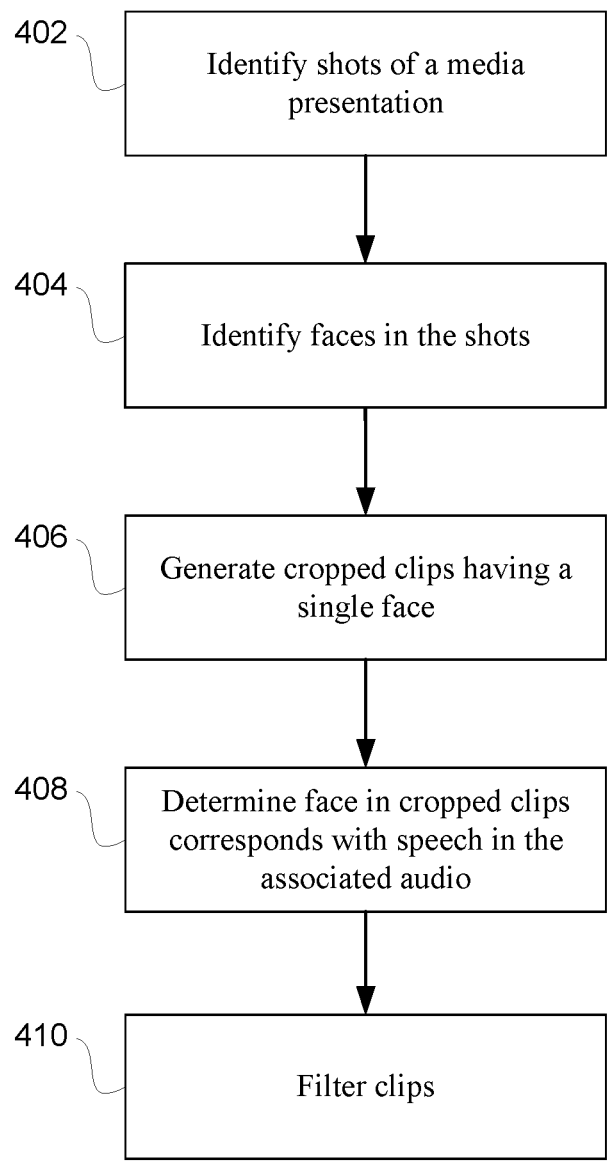
FIG. 4 presents a flow diagram for identifying clips that may be used to assess synchronization between video and dubbed audio.

FIG. 4 presents a flowchart for identifying clips that may be used to assess synchronization between dubbed audio and original video for a media presentation. Shots of a media presentation are identified (402). As noted above, a shot is a continuous sequence of frames. By focusing on shots, there is a greater chance to identify a speaker in the clip that is speaking words present in the dubbed audio. Faces may also be identified in the shots (404). Faces may be identified using various techniques, including facial landmark detection libraries. In some implementations, clips may be generated that are cropped from the original video to have a single face in the clip (406). Thus, in a shot having three faces, three clips may be generated, one for each face. In some implementations, block 406 may not be performed.

In some implementations, an active speaker may be detected (408). In many shots, a face may be present but the active speaker of associated dialogue is either a different face in the shot or not present in the shot. Thus, the clip may be analyzed to determine whether the face in the clip is an active speaker of speech in the associated audio. In some implementations, a SyncNet model may be used to identify whether the face is an active speaker. As noted above, SyncNet is a model that identifies a lead or lag shift between audio and video for a media presentation. By analyzing the clip using a SyncNet model, the model will output a score indicating how well the face and audio are synchronized. If the face in the clip is not the active speaker, a significantly low score will be output, indicating the face is a non-speaking face for the audio content. Conversely, if the face in the clip is the active speaker, then a relatively high score will be output. Notably, this analysis is done using the original audio and video, thus the audio should be aligned with the video frames. In some implementations, a SyncNet score may also be used to filter clips where the active speaker's face is significantly occluded, such that it is difficult to determine lip poses of the speaker. In such implementations, clips having a lower score may be difficult to analyze for lip poses of the speaker, thus reducing the accuracy of a score relating the dubbed audio to the lip pose.

In some implementations, one or more of operations 404-408 may skipped or omitted. For example, during operation 404 an active speaker may be determined in addition to or instead of identifying faces in the video. Thus, a cropped clip may be generated only for the face that is determined to be speaking.

Clips may then be filtered (410). In some implementations, clips may be filtered based on whether the clip depicts an active speaker of associated speech. In the face present in the clip is a non-speaking face, the clip may be filtered out. Additionally, clips may be filtered based on a duration of speech. If the face in the clip is not talking for a minimum duration, e.g., at least about 4 seconds, 5 seconds, or 6 seconds, the clip may be filtered out. In some implementations, clips may be filtered based on a size of the face in the frames. As faces are analyzed to determine lip poses, there may need to be a minimum number of pixels representing the face to allow for feature extraction to determine a lip pose. In some implementations, the number of pixels representing the face may be at least about 5% of the total pixels in the clip, or at least about a 200×200 pixel area. Faces that do not have a threshold number of pixels throughout the clip may be filtered. In some embodiments, clips may be filtered based on visibility of the face in video frames. For example, a profile view of a face is harder to analyze for lip poses as the face is partially occluded. If the face cannot be analyzed to determine a lip pose by, e.g., a facial landmark detection software, then the clip may be filtered out and not analyzed. In some embodiments, coordinates for facial landmarks may be tested to determine if they are within a range or within an upper or lower boundary relative to other facial landmarks. For example, if the left-most facial coordinate and the right-most facial coordinate are too close to each other, this may indicate the face is too far off-axis from the image plane of the video frame to accurately determine facial landmarks.

In some embodiments, various filtering operations described above in relation to block 410 may be performed during or prior to blocks 404, 406, or 408. For example, shots less than a desired duration for clips may be filtered out prior to identifying faces in the shot. Alternatively, faces may be analyzed and filtered for size prior to generating cropped clips having a single face. The result of the process shown in FIG. 4 is a set of clips depicting an active speaker of speech in the associated audio, and in some embodiments a minimum duration of speech and/or face size in the video frames. These clips may then be analyzed as described above to determine whether the dubbed audio is synchronized with the lip poses of the video frames.

Figure 5:
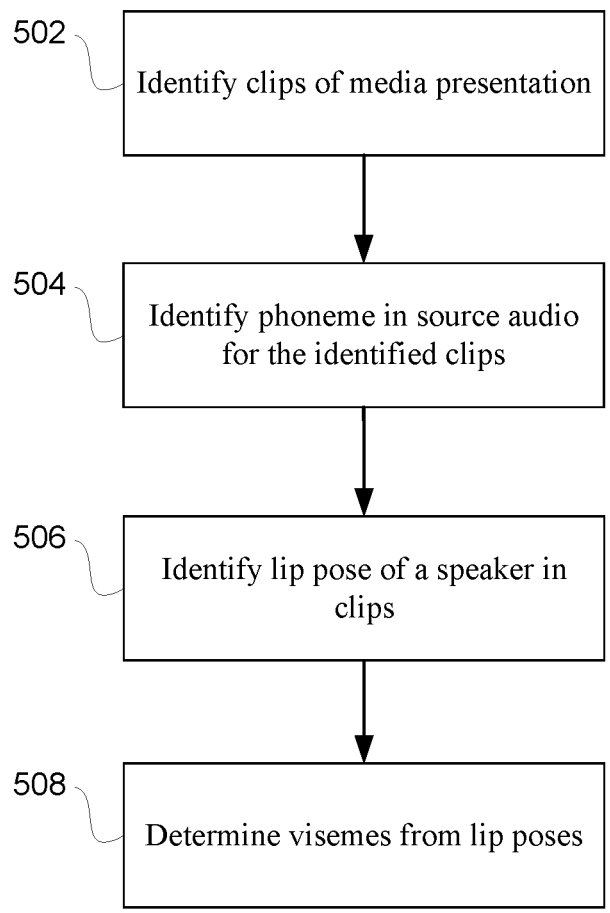
FIG. 5 presents a flow diagram for determining visemes based on sample clips.

FIG. 5 presents a process flow diagram for determining visemes. As noted above, visemes represent the expected lip pose based on the phonemes present in the audio content. Visemes may be determined by analyzing video content to determine lip poses corresponding to phonemes identified in the audio content. The process of FIG. 5 begins with identifying clips of a media presentation (502). This may be a similar process as described above in relation to FIG. 4 and block 302 of FIG. 3. Phonemes of the source audio are identified (504). This may be a similar process as described above in relation to block 304. In some implementations, all of the phonemes in the source audio for the clip are identified. As the phonemes identified need not be shared between any two particular languages, all of the phonemes present in the audio content may be identified or a subset of phonemes for the source language may be identified.

Lip poses of a speaker in each clip are identified (506). As noted above, lip poses may be determined using a facial-landmark detection library. In some implementations, lip poses may be a matrix of coordinates for landmarks in video frames. This may be performed for each clip, resulting in multiple lip poses for each phoneme. In some implementations the lip poses represent samples of visemes that correspond to identified phonemes.

Visemes may be determined based on the identified lip poses (508). In some implementations, visemes represent a lip pose based on each identified lip pose for phonemes that correspond to that viseme. As noted above, multiple phonemes may be mapped to a particular viseme. In some embodiments, this mapping may be separately determined based on, e.g., known associations between phonemes and visemes for one or more languages. Thus, lip poses of video frames that correspond to phonemes that share the same viseme may be grouped and used to determine a reference lip pose that represents the viseme. In some implementations a viseme is a single set of coordinates for facial landmarks, where facial landmarks may be determined using various techniques. The viseme may be determined using various techniques for analyzing the set of lip poses that correspond to that viseme, e.g., an average or interval for each facial landmark. The determined viseme may then be compared to lip poses of video frames to determine differences between the viseme and the lip pose, as described above in relation to FIG. 3.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A method, comprising:
   receiving a plurality of clips of a media presentation having original audio in a first language, video frames, and dubbed audio in a second language, wherein the video frames depict an active speaker and the dubbed audio represents a dubbing of speech by the active speaker;
   identifying phonemes in the dubbed audio for one or more frames of each clip, wherein the phonemes are identified from a set of phonemes, wherein each phoneme of the set of phonemes has a corresponding viseme that is shared between the first language and the second language;
   determining visemes for each of the one or more frames of each clip that correspond to the phonemes, each viseme representing an expected lip pose of the active speaker based on the dubbed audio;
   determining lip poses of the active speaker in video frames that share an index with the one or more frames that correspond to the visemes, wherein each lip pose temporally corresponds to a viseme;
   determining lip pose-viseme distances between temporally corresponding lip poses and visemes; and
   generating a notification indicating an extent to which the dubbed audio is synchronized with the lip poses of the active speaker based on the lip pose-viseme distances.

2. The method of claim 1, further comprising determining visemes based on a mapping of phonemes to visemes.

3. A method, comprising:
   receiving a clip of a media presentation having video frames and dubbed audio in a target language, wherein the target language is a different language than a source audio language;
   identifying first phonemes in the dubbed audio for the clip;
   determining visemes based on each first phoneme, wherein the visemes are selected from a set of visemes, wherein each viseme of the set of visemes is shared between the target language and the source audio language;
   determining lip poses of a speaker in the video frames, wherein each lip pose temporally corresponds to a viseme;
   determining lip pose-viseme distances between temporally corresponding lip poses and visemes; and
   determining an extent to which the dubbed audio is synchronized with the lip poses for the clip based on the lip pose-viseme distances.

4. The method of claim 3, wherein the video frames depict an active speaker and the dubbed audio represents a dubbing of speech by the active speaker.

5. The method of claim 3, further comprising identifying the clip of the media presentation by:
   identifying a shot of the media presentation;
   identifying one or more faces in video frames of the shot; and
   determining that one of the one or more faces is a speaker of speech in a source language audio.

6. The method of claim 3, wherein the visemes represent an expected lip pose of a speaker based on one or more corresponding phonemes.

7. The method of claim 6, wherein the expected lip pose is based on a set of sample video frames that depict a speaker stating a phoneme of the one or more corresponding phonemes.

8. The method of claim 3, further comprising providing a notification as feedback to an automatic dubbing module that generated the target language audio.

9. A system, comprising one or more memories and one or more processors configured for:
   receiving a clip of a media presentation having video frames and dubbed audio in a target language, wherein the target language is a different language than a source audio language;
   identifying first phonemes in the dubbed audio for the clip;
   determining visemes based on each first phoneme, wherein the visemes are selected from a set of visemes, wherein each viseme of the set of visemes is shared between the target language and the source audio language;
   determining lip poses of a speaker in the video frames, wherein each lip pose temporally corresponds to a viseme;
   determining lip pose-viseme distances between temporally corresponding lip poses and visemes; and
   determining an extent to which the dubbed audio is synchronized with the lip poses for the clip based on the lip pose-viseme distances.

10. The system of claim 9, wherein the video frames depict an active speaker and the dubbed audio represents a dubbing of speech by the active speaker.

11. The system of claim 9, wherein the one or more memories and one or more processors are further configured for identifying the clip of the media presentation by:
   identifying a shot of the media presentation;
   identifying one or more faces in video frames of the shot; and
   determining that one of the one or more faces is a speaker of speech in a source language audio.

12. The system of claim 9, wherein the visemes represent an expected lip pose of a speaker based on one or more corresponding phonemes.

13. The system of claim 12, wherein the expected lip pose is based on a set of sample video frames that depict a speaker stating a phoneme of the one or more corresponding phonemes.

14. The system of claim 9, wherein the one or more memories and one or more processors are further configured for providing a notification as feedback to an automatic dubbing module that generated the target language audio.

\* \* \* \* \*